United States Patent
Lee

(10) Patent No.: US 9,924,486 B2
(45) Date of Patent: Mar. 20, 2018

(54) APPARATUS AND METHOD FOR REGISTERING POSITION IN MOBILE COMMUNICATION SYSTEM

(71) Applicant: Samsung Electronics Co., Ltd., Suwon-si, Gyeonggi-do (KR)

(72) Inventor: Sang-Bin Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 173 days.

(21) Appl. No.: 14/188,187

(22) Filed: Feb. 24, 2014

(65) Prior Publication Data

US 2014/0242965 A1    Aug. 28, 2014

(30) Foreign Application Priority Data

Feb. 22, 2013  (KR) .................. 10-2013-0018926

(51) Int. Cl.
*H04W 24/00* (2009.01)
*H04W 64/00* (2009.01)
*H04W 52/02* (2009.01)

(52) U.S. Cl.
CPC ....... *H04W 64/00* (2013.01); *H04W 52/0216* (2013.01); *H04W 52/0254* (2013.01); *Y02B 60/50* (2013.01)

(58) Field of Classification Search
CPC ................................ H04W 64/00; H04W 4/02
USPC ............. 455/456.1, 456.2, 456.6, 432.1, 436
See application file for complete search history.

(56) References Cited

U.S. PATENT DOCUMENTS

| | | | |
|---|---|---|---|
| 2003/0013444 A1* | 1/2003 | Watanabe | H04W 60/00 455/435.1 |
| 2007/0287475 A1 | 12/2007 | Jeong et al. | |
| 2008/0113657 A1* | 5/2008 | Abu-Amara | H04W 8/245 455/415 |
| 2011/0053605 A1 | 3/2011 | Carpio et al. | |
| 2011/0077027 A1 | 3/2011 | Wang et al. | |
| 2011/0098038 A1 | 4/2011 | Kim et al. | |
| 2012/0136623 A1 | 5/2012 | Edge et al. | |
| 2012/0147732 A1 | 6/2012 | Chien et al. | |
| 2012/0161958 A1 | 6/2012 | Turon et al. | |
| 2012/0224532 A1 | 9/2012 | Suzuki et al. | |
| 2012/0231812 A1 | 9/2012 | Shim | |

FOREIGN PATENT DOCUMENTS

| | | |
|---|---|---|
| KR | 10-2007-0028855 A | 3/2007 |
| WO | 2011/097728 A1 | 8/2011 |

* cited by examiner

*Primary Examiner* — Temica M Beamer
(74) *Attorney, Agent, or Firm* — Jefferson IP Law, LLP

(57) ABSTRACT

An apparatus and a method for registering a position, which periodically update a position of a user in a mobile communication system are provided. The method includes determining whether to stop reporting position information based on a current operation state for a mobile communication service and controls whether to maintain or stop reporting the position information based on a result corresponding to the determination. Accordingly, it is possible to increase an energy efficiency by preventing an unnecessary position registering step from being performed by a User Equipment (UE) in an Out of Service (OS) area.

19 Claims, 8 Drawing Sheets

APPARATUS AND METHOD FOR REGISTERING POSITION IN MOBILE COMMUNICATION SYSTEM

CROSS-REFERENCE TO RELATED APPLICATION(S)

This application claims the benefit under 35 U.S.C. § 119(a) of Korean patent application filed on Feb. 22, 2013 in the Korean Intellectual Property Office and assigned Serial No. 10-2013-0018926, the entire disclosure of which is hereby incorporated by reference.

TECHNICAL FIELD

The present disclosure relates to a method and an apparatus for registering a position which periodically update a position of a user in a mobile communication system.

BACKGROUND

In general, a mobile communication system requires managing an accurate position of a subscriber in order to provide a smooth communication service to the subscriber.

For the smooth communication service, when a User Equipment (UE) first accesses the network, an authentication of the corresponding UE is performed, and the UE having normally passed authentication is registered in the network. Further, the mobile communication system performs system management to support mobility of the corresponding UE by setting a session and a bearer of the UE registered in the network.

The management to support the mobility representatively includes system management of position information of the corresponding UE. In order to manage the position of the UE, the system management is required to be periodically informed of the position information from the UE.

FIG. 1 illustrates an example of a conventional mobile communication system for registering a position of a UE according to the related art. The mobile communication system illustrated in FIG. 1 operates based on the Long Term Evolution (LTE) corresponding to the fourth generation communication network.

Referring to FIG. 1, a UE 10 is located within a service area 40 of Base Station (BS) A 30. The UE 10 accesses (is attached to) an LTE network 70 through BS A 30. The UE 10 periodically reports its own position information in response to a request by a position information management server that manages position information of a user. For example, the position information management server includes an LTE Positioning Protocol (LPP) server 20.

The UE 10 can move from the service area 40 of BS A 30 to a service area 60 of another BS, that is, BS B 50. In general, a condition where signal transmission/reception is not normally performed as the UE escapes from a service area of a serving BS in the LTE network is referred to as "Out of LTE Service Area". Referring to FIG. 1, the UE having moved to the service area 60 of BS B 50 is illustrated as a "UE' 10'".

The UE' 10' cannot report its own position information to the LPP server 20 through BS A 30 anymore. In this case, the UE' 10' re-accesses (is re-attached to) the LTE network 70 through BS B 50. After re-accessing (being re-attached to) the LTE network 70, the UE' 10' reports its own position information to the LPP server 20 through a path according to the re-access (re-attachment) in response to a request by the LPP server 20.

In general, a method of reporting the position information of the user in a mobile communication system may be divided into two methods according to whether a response message is provided. That is, the two methods include a method (Over User Plane) in which the position information management server does not provide a response message corresponding to the position information reported by the UE and a method (Over Control Plane) in which the position information management server provides a response message.

FIG. 2 illustrates an example of a signal processing procedure of reporting user position information based on the method in which the response message is not provided in the mobile communication system based on the general LTE network according to the related art.

It is assumed that the UE 10 includes a measurement module 12, an LPP module 14, and a Non-Access Stratum (NAS) module 16 as illustrated in FIG. 4 for the signal processing procedure in FIG. 2. The management module 12 includes A-GNSS 19, OTDOA 17 and ECID 18. Since the signal processing procedure in FIG. 2 corresponds to the method in which the response message is not provided, the UE 10 does not need to include an acknowledgement block 15 of FIG. 4.

Further, it is assumed that the LPP server 20 includes an Enhanced Serving Mobile Location Center (E-SMLC)/ SUPL Location Platform (SLP) module 22 that manages position information of the user.

For example, the signal processing procedure of FIG. 2 may be performed when a request for the response message is not set within the message reported by the UE 10. That is, the LPP server 20 does not transmit the response message in response to the received message when the acknowledgement is not set within the message through which the UE 10 reports the position information.

Referring to FIG. 2, the UE 10 receives position information report request (Request Location Information) from the LPP server 20, and reports its own position information (LPP Location Information) based on a Report Interval (RI) set within a predetermined reporting amount in response to the position information report request (Request Location Information). That is, the UE 10 receives the position information report request (Request Location Information) in operation 210, and reports the position information (LPP Location Information) in operations 250, 252, 254, 256, 258, 260, 260 and 264.

The predetermined reporting amount and the Report Interval (RI) on which the position information is reported within the predetermined reporting amount may be set by information provided when the position information report request (Request Location Information) from the LPP server 20 is made.

All position information (LPP Location Information) reported by the UE 10 may not be provided to the LPP server 20. That is, the position information (LPP Location Information) reported in a state where the UE 10 cannot normally use the mobile communication service, that is, a state of "Out of LTE Service 290" is not received by the LPP server 20 in operations 258, 260, 262 and 264.

Meanwhile, in order to allow the UE 10 to report the position information to the LPP server 20, the modules included in the UE 10 generate a message through which the position information is reported, and perform an operation to transmit the generated message.

For example, the measurement (A-GNSS/OTDOA/ ECID) module 12 generates a message through which its own position information measured based on the RI set within the predetermined reporting amount is reported in operations 214 to 228. The LPP module 14 transmits the message generated by the measurement (A-GNSS/OTDOA/ECID) module 12 to the NAS module 16 in response to the position information report request (Request Location Information) provided from the NAS module 16 in operations 212, 230, 232, 234, 236, 238, 240, 242 and 244.

The NAS module 16 transmits the report message provided from the LPP module 14 to the E-SMLC/SLP module 22 in operations 250, 252, 254, 256, 258, 260, 262 and 264.

However, the message reported by the NAS module 16 in the state of "Out of LTE Service 290" in operations 258, 260, 262 and 264 cannot be normally transmitted to the E-SMLC/SLP module 22 of the LPP server 20.

The NAS module 16 cannot identify whether the report message transmitted in the state of "Out of LTE Service 290" has been normally transmitted to the E-SMLC/SLP module 22 of the LPP server 20.

Accordingly, the modules within the UE 10 cannot help generating the message through which the position information is reported and continuously performing an operation to transmit the generated message to the LPP server 20 even in the state of "Out of LTE Service 290".

As described above, since the signal processing procedure illustrated in FIG. 2 does not have a reference which can determine the stop (abort) of the position information report by itself, an unnecessary processing load in the state of "Out of LTE Service" may be generated. Further, due to the state of "LTE Out of Service", the fact that "Out of LTE Service" has been generated cannot be provided from the LPP server. In addition, since the SUPL in charge of LPP related session connection and maintenance is not a component within a modem, the SUPL may not receive a position report stop command.

FIG. 3 illustrates an example of the signal processing procedure of reporting user position information based on the method in which the response message is provided in the mobile communication system based on the general LTE network according to the related art.

It is assumed that the UE 10 includes the measurement (A-GNSS/OTDOA/ECID) module 12, the LPP module 14, and the NAS module 16 as illustrated in FIG. 4 for the signal processing procedure in FIG. 3. For the signal processing procedure of FIG. 3, the UE 10 is required to further include the acknowledgement block 15.

Further, it is assumed that the LPP server 20 includes the Enhanced Serving Mobile Location Center (E-SMLC)/SUPL Location Platform (SLP) module 22 that manages position information of the user.

For example, the signal processing procedure of FIG. 3 may be performed when a request for the response message is set within the message reported by the UE 10. That is, the LPP server 20 transmits the response message in response to the received message when the acknowledgement is set within the message through which the UE 10 reports the position information. For example, in LPP Over Control plane, an Acknowledgement Request may be inserted into the LPP message through which the position information is reported and then the LPP message may be transmitted.

Referring to FIG. 3, the UE 10 receives position information report request (Request Location Information) from the LPP server 20, and reports its own position information (LPP Location Information) based on the RI set within the predetermined reporting amount in response to the position information report request (Request Location Information). That is, the UE 10 receives the position information report request (Request Location Information) in operation 310, and reports the position information (LPP Location Information) in operations 350, 352, 354 and 356.

The LPP server 20 transmits a response message (LPP Acknowledgement) to the UE 10 in response to each of the position information reported by the UE 10 in operations 370, 372 and 374. The UE 10 receives the response message (LPP Acknowledgement) transmitted from the LPP server 20 and thus recognizes that the position information reported by itself has been normally received by the LPP server 20.

The predetermined reporting amount and the Report Interval (RI) on which the position information is reported within the predetermined reporting amount may be set by information provided when the position information report request (Request Location Information) from the LPP server 20 is made.

All position information (LPP Location Information) reported by the UE 10 may not be provided to the LPP server 20. That is, the position information (LPP Location Information) reported in a state where the UE 10 cannot normally use the mobile communication service, that is, a state of "Out of LTE Service 390" is not received by the LPP server 20 in operations 358, 360 and 362.

In this case, the UE 10 cannot receive the response message in response to the position information reported in operations 358, 360 and 362 from the LPP server 20.

Meanwhile, in order to allow the UE 10 to report the position information to the LPP server 20, the modules included in the UE 10 generate a message through which the position information is reported, and perform an operation to transmit the generated message.

For example, the measurement (A-GNSS/OTDOA/ECID) module 12 generates a message through which its own position information measured based on the RI set within the predetermined reporting amount is reported in operations 314, 316, 318, 320 and 322. However, the measurement (A-GNSS/OTDOA/ECID) module 12 stops generating the message for reporting the position information when the measurement (A-GNSS/OTDOA/ECID) module 12 does not receive the response message from the E-SMLC/SLP module 22 of the LPP server 20.

The LPP module 14 transmits the message generated by the measurement (A-GNSS/OTDOA/ECID) module 12 to the NAS module 16 in response to the position information report request (Request Location Information) provided from the NAS module 16 in operations 330, 332, 334, 336, and 337 to 339.

The LPP module 14 receives the response message received from the E-SMLC/SLP module 22 of the LPP server 20 from the NAS module 16 in response to the report message which has been transmitted to the NAS module 16 in operations 340, 342 and 344.

The LPP module 14 stops transmitting the report message to the NAS module 16 when the LPP module 14 does not receive the response message from the E-SMLC/SLP module 22 of the LPP server 20.

The NAS module 16 transmits the report message provided from the LPP module 14 to the E-SMLC/SLP module 22 in operations 350, 352, 354, and 356. Further, the NAS module 16 receives the response message from the E-SMLC/SLP module 22 of the LPP server 20 in response to the position information reported to the E-SMLC/SLP module 22 of the LPP server 20 in operations 370, 372 and 374.

However, when the NAS module 16 does not receive the response message from the E-SMLC/SLP module 22 of the LPP server 20 due to a state of "Out of LTE Service 390", the LPP module 14 transmits the position information to the NAS module 16 by a predetermined number of times (for example, three times) on a preset period (Ack timeout period, a maximum of 250 ms) in operations 337 to 339. At this time, the transmitted position information may be information of a position where the response message is not received.

Accordingly, when the LPP module 14 does not receive the response message from the NAS module 16 or the E-SMLC/SLP module 22 of the LPP server 20, the LLP module 14 transmits the position information by the preset number of times (for example, three times).

Meanwhile, when the LPP module 14 and the NAS module 16 do not receive the response message even though they have re-transmitted the position information by the preset number of times, the LPP module 14 and the NAS module 16 stop all operations related to the transmission of the position information.

As described above, the signal processing procedure illustrated in FIG. 3 determines a reference to stop transmitting the report message as "a case where the response message is not received". However, the LPP including the UE requires reducing unnecessary LPP processing steps regardless of the user plane or the control plane.

In connection with this, the conventional mobile communication system does not disclose an operation for restarting transmission of the report message, which has stopped due to the non-reception of the response message. Accordingly, it is required to provide an efficient method of restarting the stopped transmission of the report message in the mobile communication system.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for determining whether to stop reporting position information in consideration of an operation state of a UE in a mobile communication system.

Another aspect of the present disclosure is to provide an apparatus and a method for reducing power consumption by preventing the UE from unnecessarily reporting position information in a mobile communication system.

Another aspect of the present disclosure is to provide an apparatus and a method in which a UE groups all operation states according a mobile communication service in consideration of a possibility of success of the position information report in a mobile communication system.

In accordance with an aspect of the present disclosure, a method of reporting position information of a User Equipment (UE) to a position management server by the UE supporting a mobile communication service is provided. The method includes reporting position information to the position management server at a predetermined interval in response to a request by a Base Station (BS), and stopping reporting the position information to the position management server when an operation state corresponding to a preset condition occurs.

In accordance with another aspect of the present disclosure, an apparatus for reporting position information of a UE to a position management server by the UE supporting a mobile communication service is provided. The apparatus includes a controller configured to report position information to the position management server at a predetermined interval in response to a request by a BS, and stop reporting the position information to the position management server when an operation state corresponding to a preset condition occurs.

In accordance with another aspect of the present disclosure, a UE reporting its own position information for a mobile communication service to a position management server is provided. The UE includes a message generator that measures its own position and generates a report message including position information according to the measurement, a monitoring unit that outputs a current operation state according to the mobile communication service, and a transmission controller that controls whether to maintain or stop transmitting the report message generated by the message generator based on the current operation state output from the monitoring unit.

In accordance with another aspect of the present disclosure, a method of reporting position information of a UE to a position management server for a mobile communication service by the UE is provided. The method includes measuring its own position and generating a report message including position information according to the measurement, outputting a current operation state according to the mobile communication service, and controlling whether to maintain or stop transmitting the generated report message based on the outputed current operation state.

According to the present disclosure, it is possible to increase an energy efficiency of a UE by preventing an unnecessary position registration procedure from being performed in an Out of Service area. Meanwhile, other various effects will be explicitly or implicitly disclosed in a detailed description according to embodiments of the present disclosure described below.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
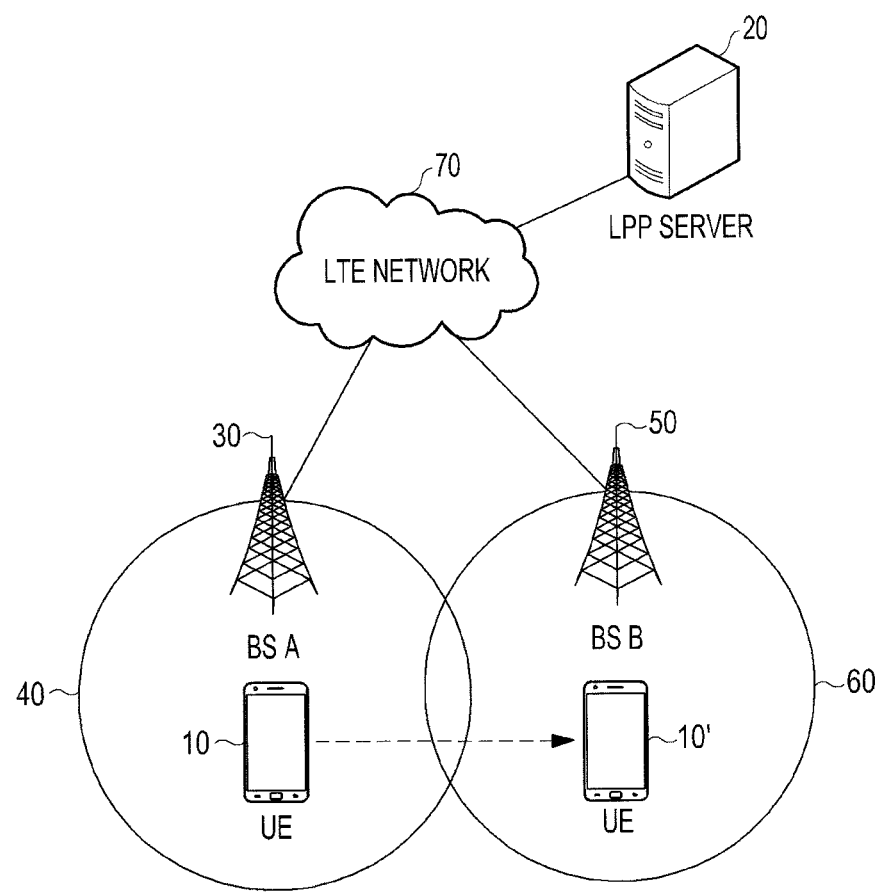
FIG. 1 illustrates an example of a conventional mobile communication system for registering a position of a User Equipment (UE) according to the related art.
Figure 2:
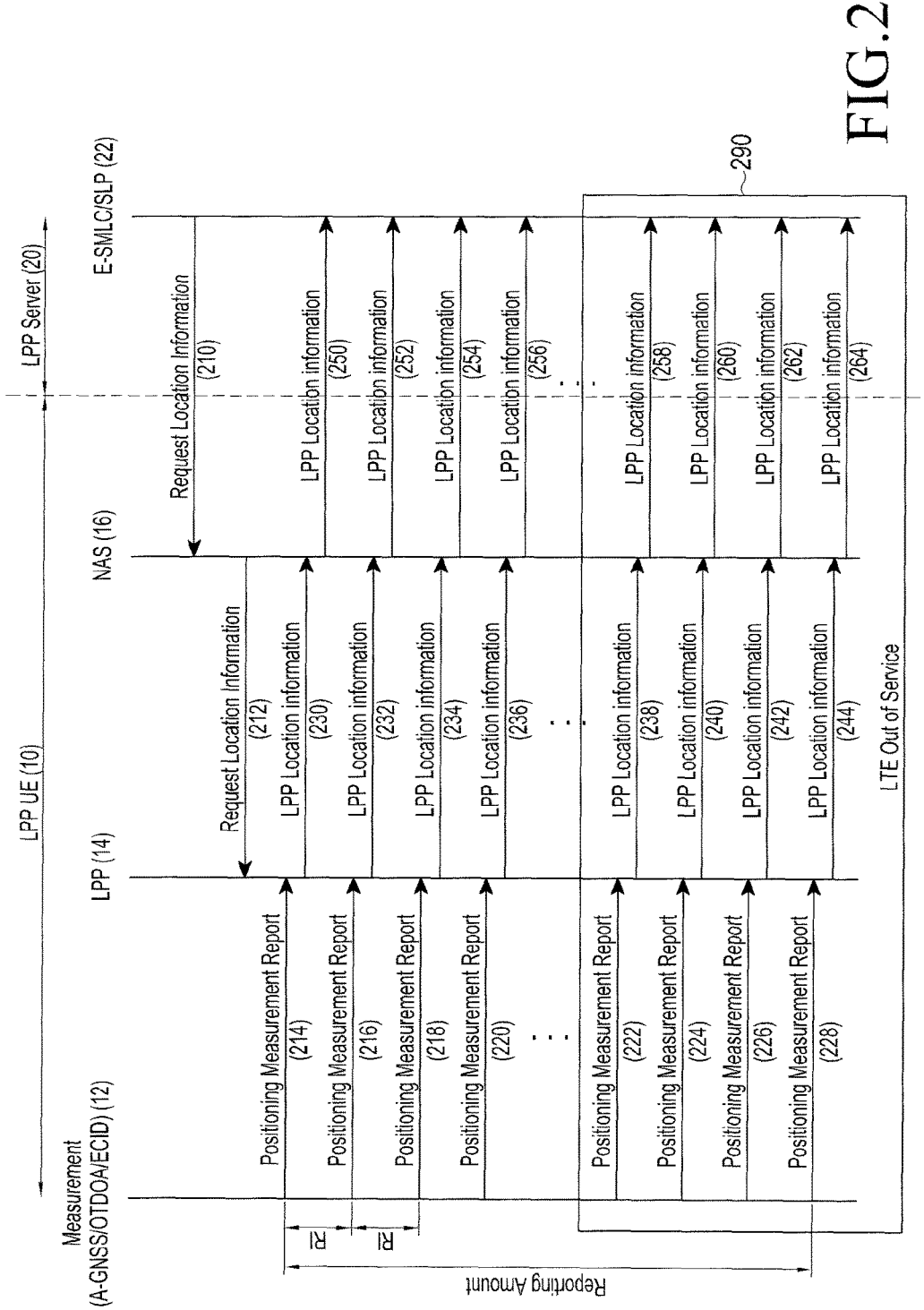
FIG. 2 illustrates an example of a signal processing procedure of reporting user position information based on a method in which a response message is not provided in a mobile communication system based on a general LTE network according to the related art.
Figure 3:
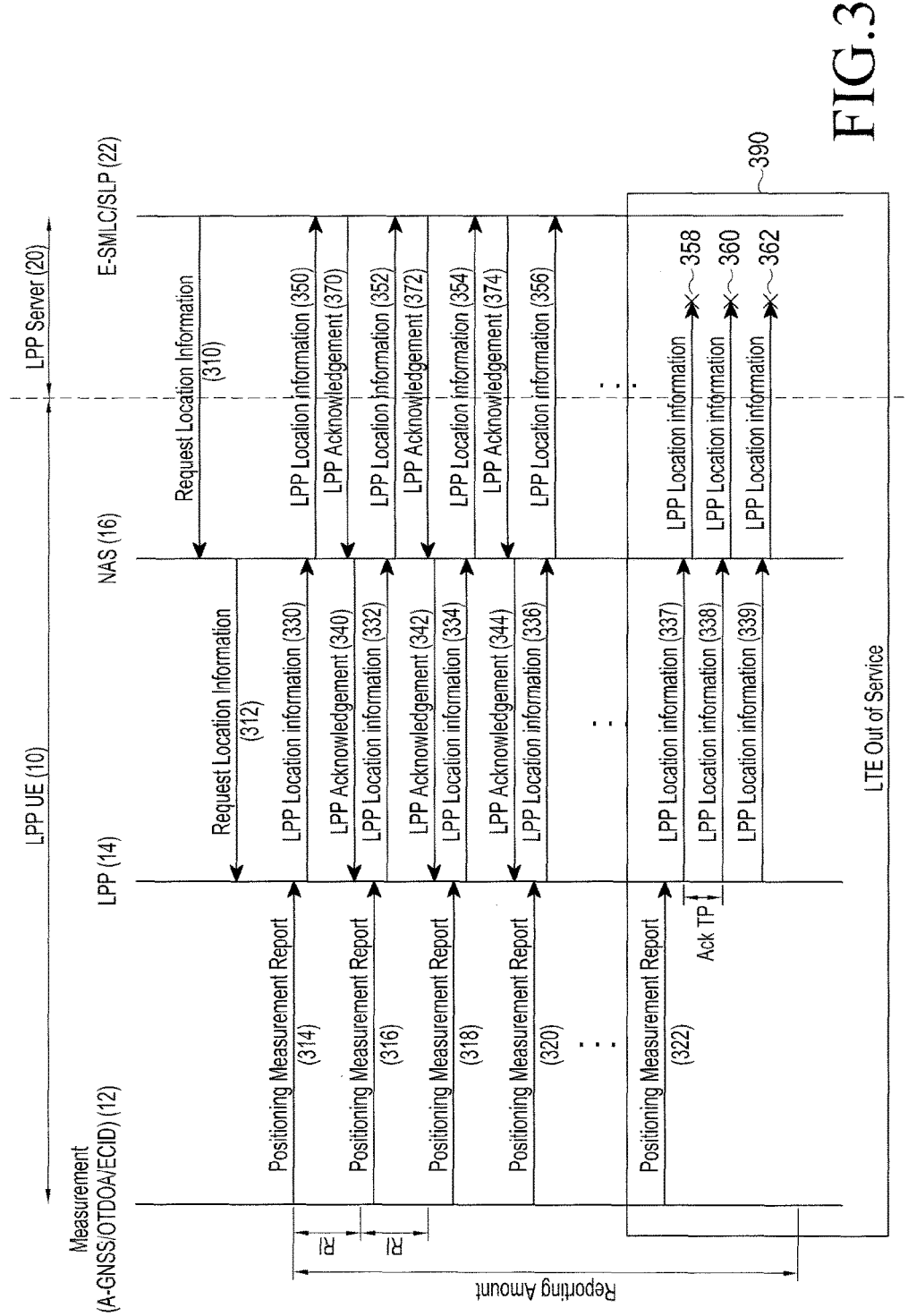
FIG. 3 illustrates an example of a signal processing procedure of reporting user position information based on a method in which a response message is provided in a mobile communication system based on a general LTE network according to the related art.
Figure 4:
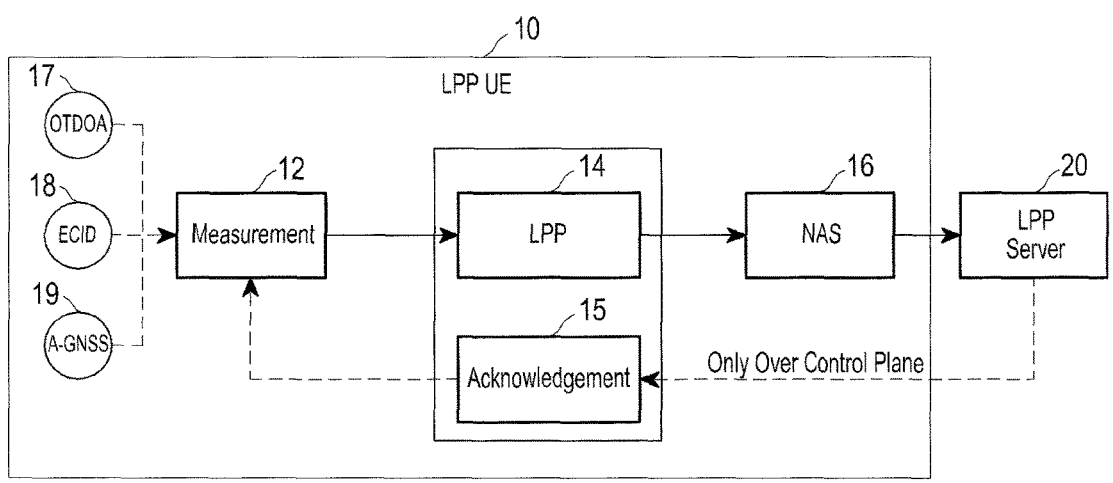
FIG. 4 illustrates a configuration of a UE supporting a mobile communication service based on a conventional LTE network according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In general, in an LTE-based mobile communication system, an LPP measurement and an LTE service have a close relationship. Accordingly, when the UE is located at an Out of LTE Service area, the LPP measurement cannot be normally performed, and thus position information according to the LPP measurement cannot be transmitted to an LPP server. That is, LPP of the UE located at the Out of LTE Service area should be stopped (aborted).

For example, in the LTE-based mobile communication system, the activated UE may measure its own position in the unit of cells and report the measured position information to a position management server in a state where the UE accesses (is attached to) the LTE network.

However, the UE which is inactive or detached from the LTE network cannot measure its own position or the UE can detect its own position in the unit of Tracking Areas (TAs) but cannot report its own position information to the position management server since an ECM connection is released. In the present disclosure, the UE which is inactivate or detached from the LTE network is considered as the UE located at the Out of LTE Service area.

In general, the LPP is implemented in the modem of the UE to measure OTDOA and ECID. Accordingly, it may be checked, by the NAS included in the modem of the UE, whether to use the LTE service by a state of the LTE network.

In an embodiment of the present disclosure described below, a current operation state is checked by the NAS included in the modem of the UE, and it is determined whether to stop (abort) the position information report based on the current operation state according to a result of the check.

For example, in an embodiment of the present disclosure, all operation states according to the mobile communication service are grouped in consideration of a possibility of the position information report, and then it is determined whether to stop (abort) the position information report based on a group including the current operation state according to a result of the check. Accordingly, an embodiment of the present disclosure provides a reference for grouping the operation states based on the possibility of the position information report.

Hereinafter, various embodiments of the present disclosure will be described with reference to the accompanying drawings in detail.

Figure 5:
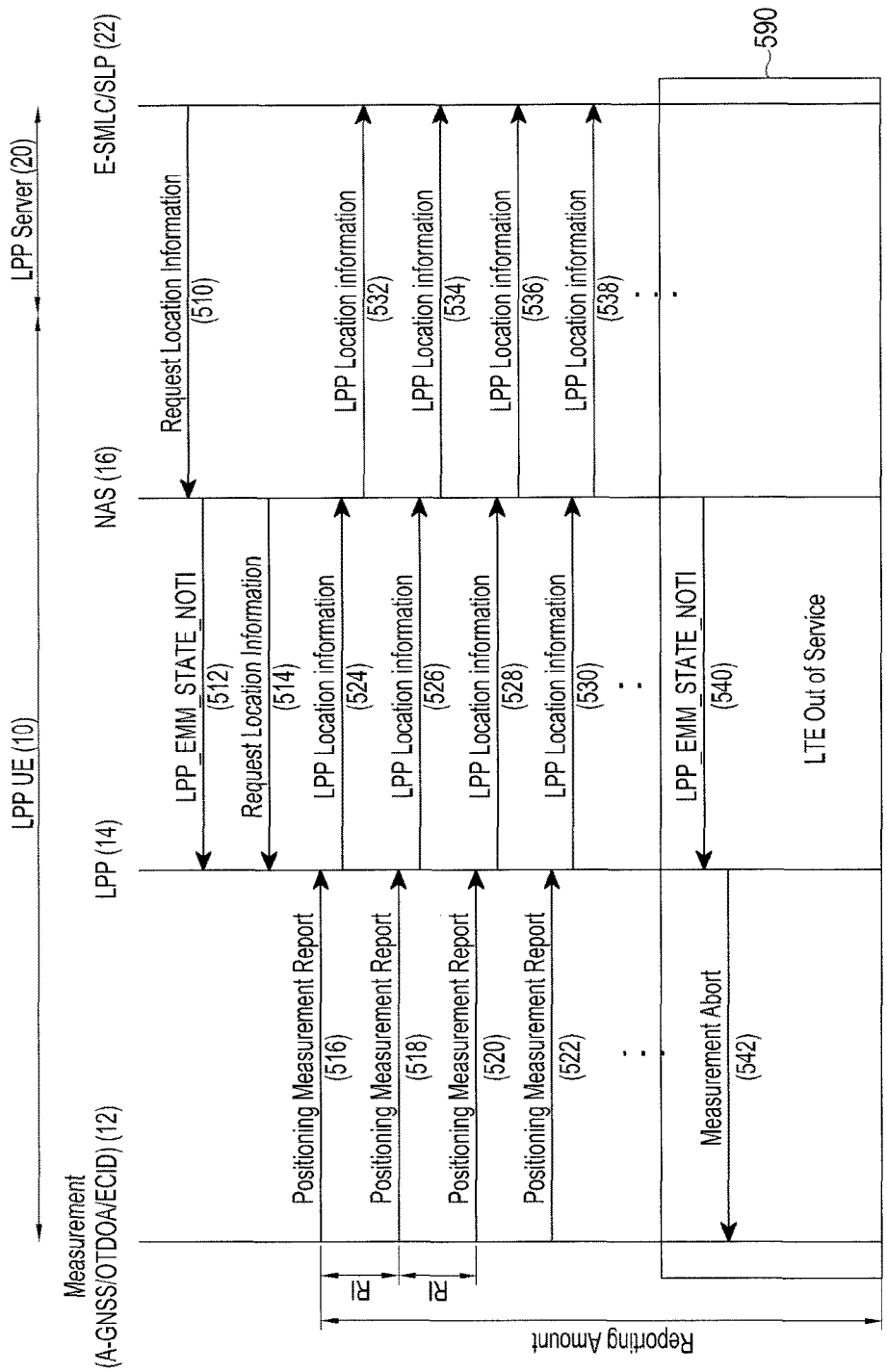
FIG. 5 illustrates an example of a signal processing procedure of reporting user position information based on a method in which a response message is not provided in a mobile communication system based on an LTE network according to an embodiment of the present disclosure.

FIG. 5 illustrates an example of a signal processing procedure of reporting user position information based on the method in which the response message is not provided in the mobile communication system based on the LTE network according to an embodiment of the present disclosure.

It is assumed that the UE 10 includes the measurement (A-GNSS/OTDOA/ECID) module 12, the LPP module 14, and the Non-Access Stratum (NAS) module 16 for a signal processing procedure illustrated in FIG. 5. Further, it is assumed that the LLP server 20 includes the Enhanced Serving Mobile Location Center (E-SMLC)/SUPL Location Platform (SLP) module 22 that manages position information of the user.

Meanwhile, in the signal processing procedure of FIG. 5, it is assumed that the UE 10 is normally registered through a subscriber authentication while accessing the LTE network, an EPS session and a bearer are set to use a mobile communication service, and a management to support mobility is made.

Referring to FIG. 5, the UE 10 receives the position information report request (Request Location Information) from the LLP server 20, and reports its own position information (LLP Location Information) based on a Report Interval (RI) set within a predetermined reporting amount in response to the position information report request (Request Location Information). That is, the UE 10 receives the position information report request (Request Location Information) in operation 510, and reports the position information (LLP Location Information) in operations 532, 534, 536 and 538.

The predetermined reporting amount and the RI on which the position information is reported within the predetermined reporting amount may be set by information provided when the position information report request (Request Location Information) from the LLP server 20 is made.

Meanwhile, the UE 10 checks a current operation state (EMM State) according to a mobile communication service before reporting the position information in response to the position information report request (Request Location Information). Further, the UE 10 determines whether the operation state according to a result of the check is suitable for reporting the position information.

The UE 10 reports the position information only when it is determined that the operation state is suitable for reporting the position information. When it is determined that the operation state is not suitable for reporting the position information, the UE 10 stops reporting the position information. It is because the operation state which is not suitable for reporting the position information may be considered as the UE 10 being located at an Out of LTE Service area.

For example, the UE 10 identifies the group including the checked operation state from pre-grouped groups, and determines whether to stop reporting position information according to whether the identified group is suitable for reporting the position information.

Accordingly, the UE is required to group all operation states according to the mobile communication service into a plurality of groups based on a predetermined reference and internally manage the groups. It will be described below in detail.

As described above, when it is determined that the UE is in the state of "Out of LTE Service area", the UE stops reporting the position information to the position management server in operation 590.

A signal processing procedure performed to determine whether to report the position information based on the operation state of the UE 10 will be described below in detail.

When receiving the position information report request (Request Location Information) from the LPP server 22, the NAS 16 of the UE 10 identifies a current operation state according to the mobile communication service. For example, the current operation state may be identified based on whether the UE is activated or accesses (is attached to) the network for the mobile communication service.

The NAS 16 provides the identified current operation state to the LPP stratum 14 through a pre-arranged message (LPP_EMM_STATE_NOTI) in operation 512. The LPP stratum 14 determines whether to stop reporting the position information based on the current operation state provided from the NAS 16. For example, when it is determined that the current operation state is not suitable for reporting the position information, the LPP stratum 14 determines whether to stop reporting the position information. However, when it is determined that transmission of the position information is possible in the current operation state, the LPP stratum 14 determines whether to continuously report the position information.

Although not illustrated, the LPP stratum 14 may inform a stratum that generates the report message, that is, the measurement stratum 12 of a result of the determination whether to report the position information.

When it is determined to maintain reporting the position information by the LPP stratum 14, the measurement stratum 12 generates its own position information (LPP Location Information) based on the Report Interval (RI) set within the predetermined reporting amount in operations 516, 518, 520, 522 and 522. The LPP module 14 transmits the message generated by the measurement (A-GNSS/OT-DOA/ECID) measurement stratum 12 to the NAS module 16 in response to the position information report request (Request Location Information) 514 provided from the NAS module 16 in operations 524, 526, 528 and 530.

The NAS 16 continuously checks whether the current operation state according to the mobile communication service is changed even in a condition where the position information is normally reported. When a transition to an operation state in which the position information cannot be normally reported occurs, the NAS 16 provides the current operation state to the LPP stratum 14 through a pre-arranged message (LPP_EMM_STATE_NOTI) in operation 540.

The LPP stratum 14 determines that the current operation state is not suitable for reporting the position information based on the current operation state provided in operation 540 from the NAS 16. Further, the LPP stratum 14 transmits a message instructing to stop reporting the position information to the measurement stratum 12 in operation 542.

When the measurement stratum 12 receives the instruction to stop reporting the position information from the LPP stratum 14 in operation 542, the measurement stratum 12 does not generate the position information anymore although the reporting amount has not passed.

When it is determined to restart reporting the position information by the LPP stratum 14 before the reporting amount has passed in a state where the position information is not generated, the measurement stratum 12 restarts generating the position information.

Figure 6:
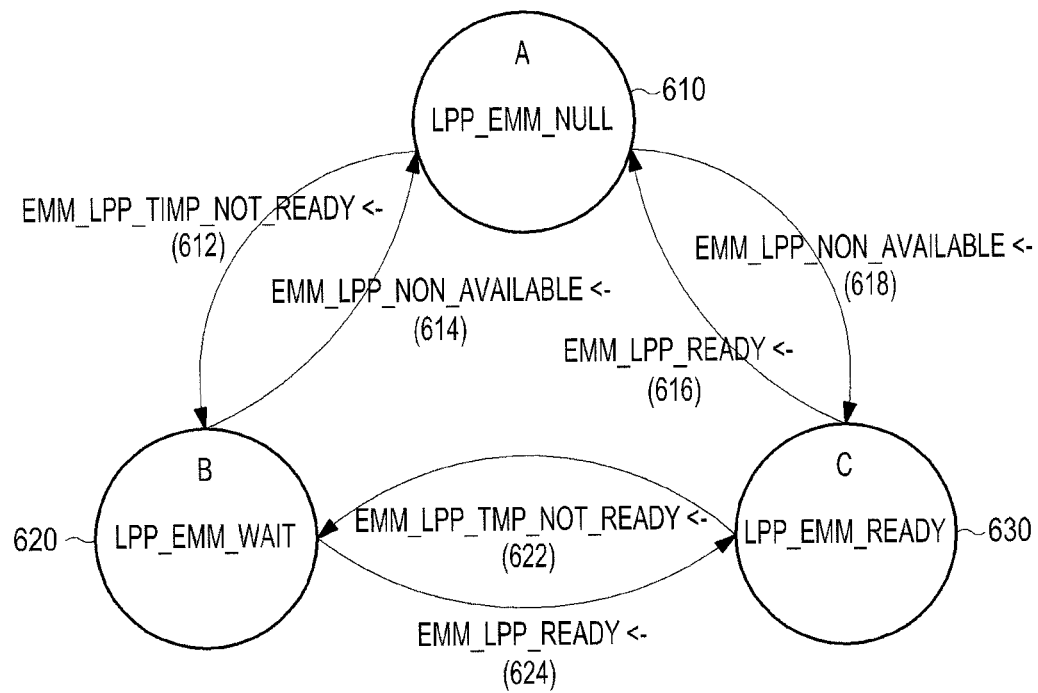
FIG. 6 is a diagram defining a state transition relation for reporting position information according to an embodiment of the present disclosure.

FIG. 6 defines a state transition relation for reporting the position information according to an embodiment of the present disclosure. That is, FIG. 6 shows a state transition between operation modes corresponding to a group according to the grouping of the operation states.

Referring to FIG. 6, the operation mode of the UE is largely divided into operation mode A 610, operation mode B 620, and operation mode C 630.

Operation mode A (LPP_EMM NULL state) 610 refers to an operation state satisfying a null condition and means an operation state requiring a reconnection (re-attachment) with the network for the mobile communication service. The null condition includes whether a connection (attachment) between the UE and the network is maintained.

For example, operation mode A (LPP_EMM NULL state) 610 corresponds to an operation state in which the UE is separated from the network, and corresponds to "EMM-Deregistered" defined in the LTE system. The operation state in which the UE is separated from the network in the LTE system has different access procedures according to information related to the UE included in the network. However, according to an embodiment of the present disclosure, since nothing is changed by the information of the separated UE included in the network, all are considered as the same operation states for the convenience of a description.

Operation mode A (LPP_EMM NULL state) 610 corresponds to a state in which the UE is disconnected from the LTE network representatively due to a reason such as G Handover, TAU Reject, Network Detach or the like and then does not access the LTE network.

In this case, since the LPP stratum cannot transmit data to an LPP server through the LTE network, all operations (measurement and LPP protocol) of corresponding transaction are stopped.

When the connection (attachment) with the network is made and the mobile communication service is activated in operation mode A (LPP_EMM NULL state) 610, the NAS transmits "EMM_LPP_READY" to the LPP stratum in operation 616. Accordingly, the LPP stratum switches the LPP_EMM state from operation mode A (LPP_EMM NULL state) 610 to operation mode C (LPP_EMM_READY state) 630.

When the connection (attachment) with the network is made but the mobile communication service is inactive, the NAS transmits "EMM_LPP_TMP_NOT_READY" to the LPP stratum in operation 612. Accordingly, the LPP stratum switches the LPP_EMM state from operation mode C (LPP_EMM_READY state) 630 to operation mode B (LPP_EMM_WAIT state) 620.

Operation mode B (LPP_EMM_WAIT state) 620 refers to an operation state satisfying a wait condition. For example, operation B (LPP_EMM_WAIT state) 620 corresponds to an operation state where the UE maintains the connection (EPS bearer) with the network but the mobile communication service is inactive. That is, "EMM-Registered+ECM-Idle+RRC-Idle" defined in the LTE system corresponds to operation mode B (LPP_EMM_WAIT state) 620.

In this case, since the LPP stratum cannot transmit data to the LPP server through the LTE network, all operations (measurement and LPP protocol) of corresponding transaction are stopped. However, the LPP stratum may restart all the stopped operations when the mobile communication service is activated or the connection (attachment) with the network is maintained.

For example, when Acknowledgement is set, the LPP stratum operating in the control plane stops the corresponding transaction when the mobile communication service (LTE service) is not serviced until a time of 750 ms (250 ms (maximum Ack. expired timer)*3) passes. However, when the mobile communication service (LTE service) is activated sooner, it is required to newly execute an LPP Location Request process to restart the stopped transaction.

Accordingly, when the state is not changed to LPP_READY for 750 ms even though Acknowledgement is not set, operations which have been performed are stored without stopping all operations of the corresponding transaction. Therefore, when the mobile communication service (LTE service) is activated, the stopped transaction can be restarted. Through the use of the EMM state, the stopped operation in an exceptional situation can be effectively progressed without any data exchange.

To sum up, when the UE is disconnected (detached) from the network in operation mode B (LPP_EMM_WAIT state) 620, the NAS transmits "EMM_LPP_NON_AVAILBLE" to the LPP stratum in operation 614. Accordingly, the LPP stratum switches the LPP_EMM state from operation mode B (LPP_EMM_WAIT state) 620 to operation mode A (LPP_EMM_NULL state) 610.

When the connection (attachment) with the network is made and the mobile communication service is activated in operation mode B (LPP_EMM_WAIT state) 620, the NAS transmits "EMM_LPP_READY" to the LPP stratum in operation 624. Accordingly, the LPP stratum switches the LPP_EMM state from operation mode B (LPP_EMM_WAIT state) 620 to operation mode C (LPP_EMM_READY state) 630.

Operation mode C (LPP_EMM_READY state) 630 refers to an operation state satisfying a ready condition. For example, operation mode C (LPP_EMM_READY state) 630 corresponds to an operation state in which the mobile communication service can be normally performed. The ready condition includes a state in which the connection (attachment) with the network is maintained and the mobile communication service is activated.

For example, "EMM-Registered+ECM-Connected+RRC-Connected" defined in the LTE system corresponds to operation mode C (LPP_EMM_READY state) 630.

When the UE is disconnected (detached) from the network in operation mode C (LPP_EMM_READY state) 630, the NAS transmits "EMM_LPP_NON_AVAILBLE" to the LPP stratum in operation 618. Accordingly, the LPP stratum switches the LPP_EMM state from operation mode C (LPP_EMM_READY state) 630 to operation mode A (LPP_EMM_NULL state) 610.

When a situation occurs in which the mobile communication service cannot be used for a while such as a situation in which the mobile communication service is inactive in operation mode C (LPP_EMM_READY state) 630, the NAS transmits "EMM_LPP_TMP_NOT_READY" to the LPP stratum in operation 622. Accordingly, the LPP stratum switches the LPP_EMM state from operation mode C (LPP_EMM_READY state) 630 to operation mode B (LPP_EMM_WAIT state) 620.

Figure 7:
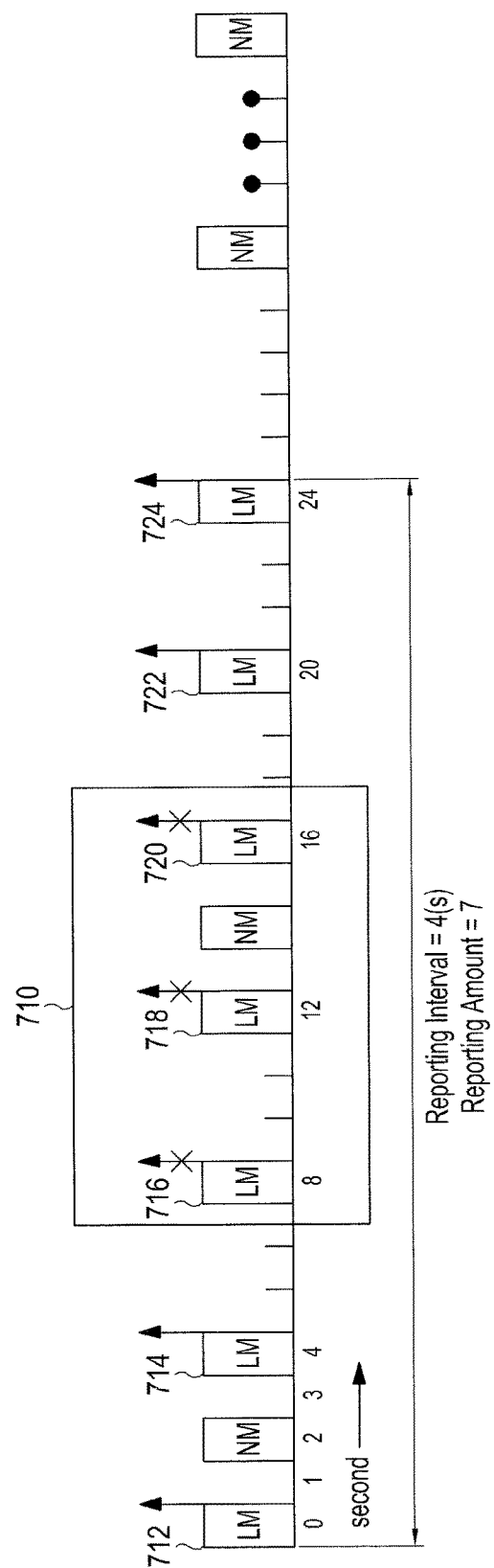
FIG. 7 illustrates an example of an operation scenario of a UE according to an embodiment of the present disclosure.

FIG. 7 illustrates an example of an operation scenario of the UE according to an embodiment of the present disclosure. Referring to FIG. 7, it is assumed that an LPP measurement result may be transmitted seven times in every four second report interval.

In the operation scenario illustrated in FIG. 7, first and second LPP measurement results 712 and 714 have been successfully transmitted, but transmission of third, fourth, and fifth LPP measurement results 716, 718, and 720 have failed. In this case, reporting the LPP measurement result is stopped. Thereafter, when the connection (attachment) with the LTP network is successful and thus the LTE service can be used again, the stopped transactions restart to transmit sixth and seventh LPP measurement results 722 and 724.

Figure 8:
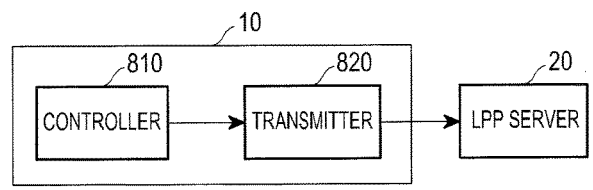
FIG. 8 is a block diagram illustrating a UE according to an embodiment of the present disclosure.

FIG. 8 is a block diagram of the UE according to an embodiment of the present disclosure. FIG. 8 only illustrates devices required for reporting position information to the position management server by the UE supporting the mobile communication service.

Referring to FIG. 8, a controller 810 determines whether to stop reporting the position information based on a current operation state for the mobile communication service. The controller 810 determines whether to maintain or stop reporting the position information according to a result corresponding to the determination.

The controller 810 groups all operation states according to the mobile communication service based on a preset condition in consideration of a possibility of success of the position information report. The preset condition includes a null condition, a wait condition, and a ready condition. The null condition corresponds to a condition to classify operation states requiring a reconnection with the network for the mobile communication service. The wait condition corresponds to a condition to classify operation states in which the mobile communication service is stopped but the restoration is possible without a reconnection with the network. The ready condition corresponds to a condition to classify operation states in which the mobile communication service can be normally performed.

As described above, when the preset conditions are defined, the controller 810 determines the condition corresponding to the current operation state for the mobile communication service from the null condition, the wait condition, and the ready condition included in the preset conditions. When the current operation state for the mobile communication service satisfies the null condition or the wait condition based on the determination, the controller 810 determines whether to stop reporting the position information. However, when the current operation state for the mobile communication service satisfies the ready condition based on the determination, the controller 810 determines whether to maintain reporting the position information.

When it is determined to stop reporting the position information, the controller 810 stops reporting the position information. However, when it is determined to maintain reporting the position information, the controller 810 continuously maintains reporting the position information.

When the current operation state for the mobile communication service satisfies the null condition and thus the position information report is stopped, the controller 810 restarts reporting the position information if the current operation state satisfies the ready condition through the reconnection with the network.

When the current operation state for the mobile communication service satisfies the null condition and thus the position information report is stopped, the controller 810 restarts reporting the position information if the current operation state for the mobile communication service satisfies the ready condition through the reconnection with the network.

A transmitter 820 generates a message to report the position information according to the controller 810. The transmitter 820 transmits the generated message to the LPP server 20 through the network based on the report interval within the preset reporting amount.

Figure 9:
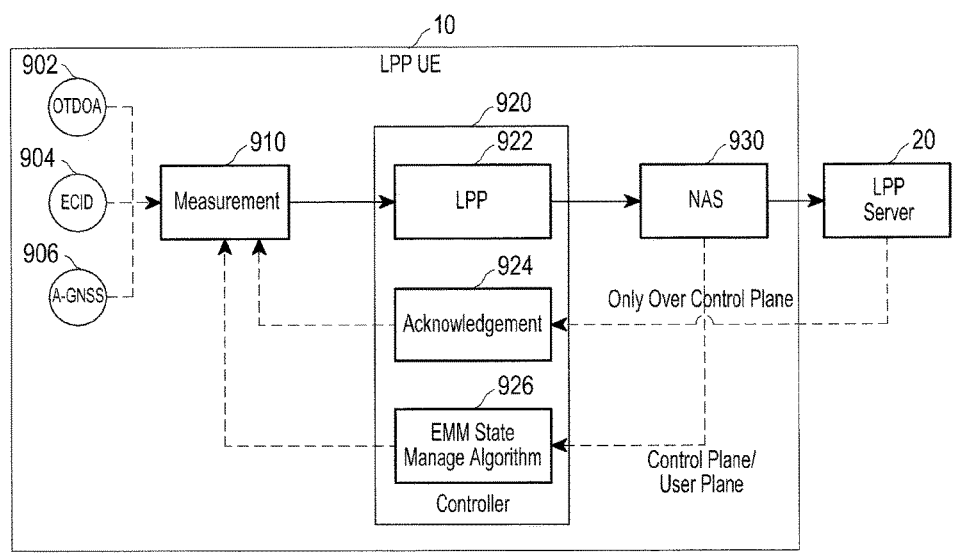
FIG. 9 illustrates a stratum structure of a UE that reports its own position information to an LPP server according to an embodiment of the present disclosure.

FIG. 9 illustrates a stratum structure of the UE that reports its own position information to the LPP server according to an embodiment of the present disclosure.

Referring to FIG. 9, a message generator (measurement layer) 910 including OTDOA 902, FCID 904 and A-GNSS 906, measures its own position, and generates a message to report position information according to the measurement to the LPP server 20. For example, the message generator (measurement layer) 910 generates a report message based on a report interval and a reporting amount set according to the information provided from the LPP server 20.

A monitoring unit (NAS layer) 930 checks a current operation state for the mobile communication service and outputs a result thereof.

A transmission controller 920 determines whether to stop transmitting the report message generated by the message generator (measurement layer) 910 based on the current operation state output from the monitoring unit (NAS layer) 930. Further, the transmission controller 920 controls whether to maintain or stop the transmission of the report message according to the determination.

For the control, the transmission controller 920 includes an LPP stratum 922, a response signal processor 924, and an EMM state manager 926.

The LPP stratum 922 groups all operation states according to the mobile communication service based on a preset condition in consideration of a possibility of success of the position information report. The LPP stratum 922 determines the group including the current operation state provided by the monitoring unit (NAS layer) 930 and determines whether to stop transmitting the report message generated by the message generator (measurement layer) 910 according to a result of the determination.

As described above, the preset condition includes the null condition, the wait condition, and the ready condition.

The transmission controller 920 determines the condition satisfied by the current operation state for the mobile communication service from the null condition, the wait condition, and the ready condition included in the preset conditions. Further, the transmission controller 920 determines whether to stop reporting the position information when the current operation state for the mobile communication service satisfies the null condition or the wait condition based on the determination. However, when the current operation state for the mobile communication service satisfies the ready condition based on the determination, the transmission controller 920 determines whether to maintain reporting the position information.

The transmission controller 920 stops reporting the position information when the stop of the position information is determined. However, when it is determined to maintain reporting the position information, the transmission controller 920 continuously reports the position information.

For example, when the current operation state for the mobile communication service satisfies the null condition and thus the position information report is stopped, the transmission controller 920 restarts reporting the position information if the current operation state for the mobile communication service satisfies the ready condition through the reconnection with the network. However, when the current operation state for the mobile communication service satisfies the wait condition and thus the position information report is stopped, the transmission controller 920 restarts reporting the position information if the current operation state for the mobile communication service satisfies the ready condition in a state where the connection with the network is maintained.

It should be noted that the various embodiments of the present disclosure, as described above, typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. Such instructions may be stored on one or more processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of reporting position information of a user equipment (UE) to a position management server by the UE supporting a mobile communication service, the method comprising:

transmitting, by the UE, the position information to the position management server at a predetermined interval in response to a request by a base station (BS);

identifying, by the UE, a current operation state based on whether the UE is activated and is attached to a network for the mobile communication service;

grouping operation states according to the mobile communication service;

determining a group including the current operation state; and terminating, by the UE, the transmitting of the position information to the position management server based on the group including the current operation state.

2. The method of claim 1, further comprising restarting the transmitting of the position information according to the request by the BS when the operation state is changed.

3. The method of claim 1, wherein the operation state is an operation state in which the UE is not activated and is not attached to a network for the mobile communication service.

4. The method of claim 3, wherein the operation state in which the UE is not activated and is not attached to a network for the mobile communication service includes at least one of an operation state requiring a reconnection with a network or an operation state in which a restoration is possible without the reconnection with the network.

5. The method of claim 1, wherein the predetermined interval is set by information provided from the position management server when a position information report request is made by the BS.

6. An apparatus for reporting position information of a user equipment (UE) to a position management server by the UE supporting a mobile communication service, the apparatus comprising:
 a transmitter; and
 at least one processor configured to:
  transmit the position information to the position management server at a predetermined interval in response to a request by a base station (BS),
  identify a current operation state based on whether the UE is activated and is attached to a network for the mobile communication service,
  group operation states according to the mobile communication service,
  determine a group including the current operation state, and
  terminate the transmitting of the position information to the position management server based on the group including the current operation state.

7. The apparatus of claim 6, wherein the at least one processor is further configured to restart transmitting the position information according to the request by the BS when the operation state is changed.

8. The apparatus of claim 6, wherein the operation state is an operation state in which the UE is not activated and is not attached to a network for the mobile communication service.

9. The apparatus of claim 8, wherein the operation state in which the UE is not activated and is not attached to a network for the mobile communication service includes at least one of an operation state requiring a reconnection with a network or an operation state in which a restoration is possible without the reconnection with the network.

10. The apparatus of claim 6, wherein the at least one processor is further configured to set the predetermined interval by information provided from the position management server when a position information report request is made by the BS.

11. A user equipment (UE) reporting position information of the UE for a mobile communication service to a position management server, the UE comprising:
 a memory configured to store instructions; and
 at least one processor executing the instructions configured to:
  measure the UE's own position,
  generate a report message including position information based on the measurement of the UE,
  identify a current operation state based on whether the UE is activated and is attached to a network for the mobile communication service, and
  transmit the generated report message to the position management server based on the current operation state,
 wherein the at least one processor is further configured to:
  group operation states according to the mobile communication service,
  determine a group including the current operation state, and
  determine whether to terminate transmitting the generated report message based on the group including the current operation state.

12. The UE of claim 11, wherein the at least one processor is further configured to stop transmitting the generated report message when it is determined that the current operation state is included in a group corresponding to an operation state in which the UE is not activated and is not attached to a network for the mobile communication service.

13. The UE of claim 12, wherein the operation state in which the UE is not activated and is not attached to a network for the mobile communication service includes at least one of an operation service in which a reconnection with a network is required or an operation state in which a restoration is possible without the reconnection with the network.

14. The UE of claim 11, wherein the at least one processor is further configured to set a transmission interval of the generated report message by information provided from the position management server when a position information report request is made by a base station (BS).

15. A method of reporting position information of a user equipment (UE) to a position management server for a mobile communication service by the UE, the method comprising:
 measuring the UE's own position;
 generating a report message including position information according to the measurement;
 identifying an current operation state based on whether the UE is activated and is attached to a network for the mobile communication service; and
 controlling to transmit the generated report message to the position management server based on the the current operation state,
 wherein the controlling to transmit the generated report message comprises:
  grouping operation states according to the mobile communication service,
  determining a group including the current operation state, and
  determining whether to stop transmitting the generated report message based on the group including the current operation state.

16. The method of claim 15, wherein the determining whether to stop transmitting comprises determining whether to stop transmitting the generated report message when it is determined that the current operation state is included in a group corresponding to an operation state in which the UE is activated and is attached to a network for the mobile communication service.

17. The method of claim 16, wherein the operation state in which the mobile communication service cannot be used includes at least one of an operation state in which a reconnection with a network is required or an operation state in which a restoration is possible without the reconnection with the network.

18. The method of claim 15, further comprising setting a transmission interval of the generated report message by information provided from the position management server when a position information report request is made by a base station (BS).

19. The method of claim 15, further comprising:
when the current operation state for the mobile communication service is one of a null condition and a wait condition, stopping transmission of the generated report message;
restarting the transmission of the generated report message when the current operation state transitions from the null condition to a ready condition through the reconnection with the network; and
restarting the transmission of the generated report message when the current operation state transitions from the wait condition to a ready condition though a network connection being maintained.

\* \* \* \* \*